UNITED STATES PATENT OFFICE 2,454,050

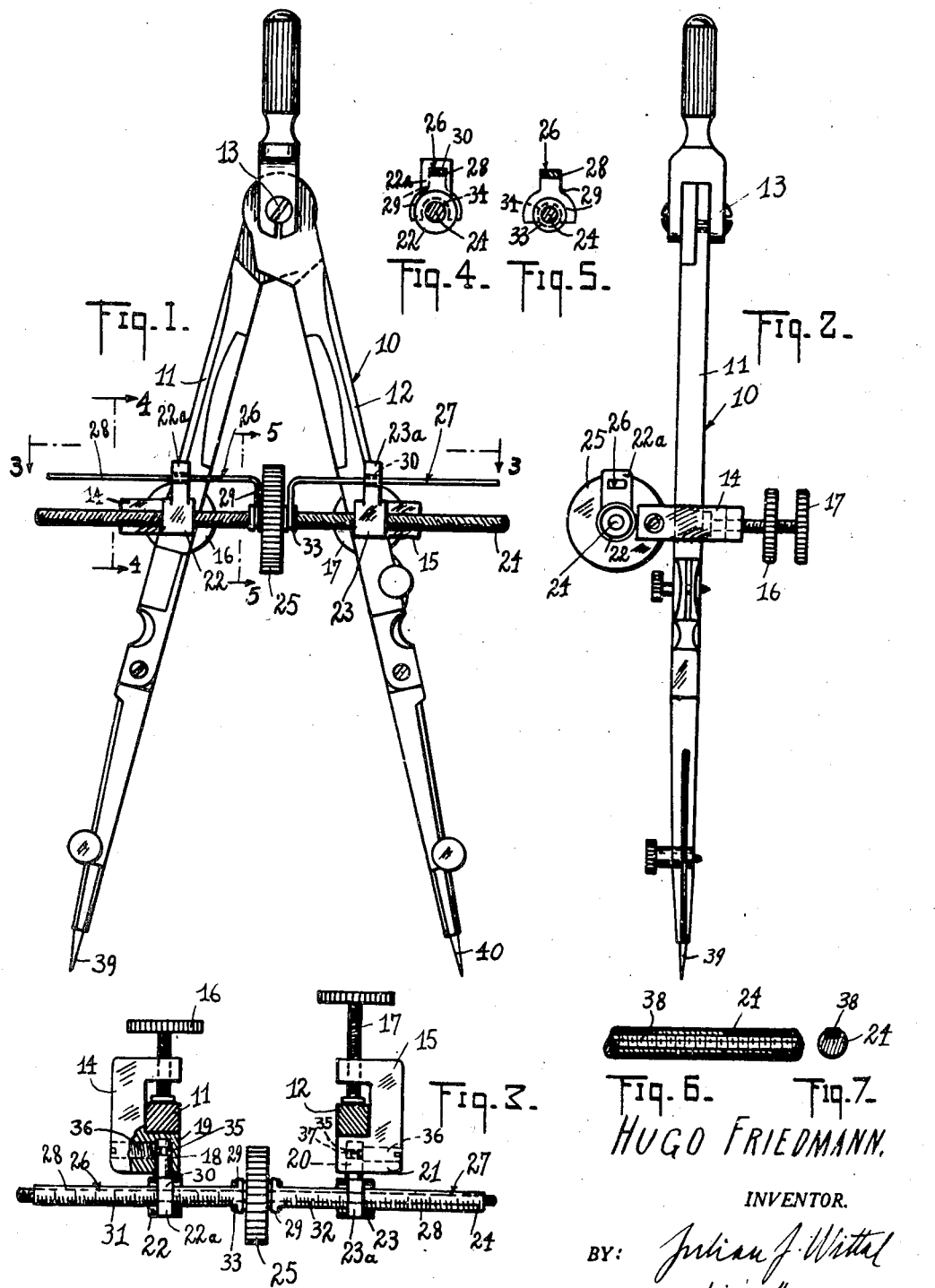

DIVIDER AND THE LIKE WITH MEASURING SCALES

Hugo Friedmann, Astoria, N. Y.

Application October 9, 1943, Serial No. 505,613

5 Claims. (Cl. 33—148)

This invention relates to dividers, calipers, and like instruments, particularly of pivoted legs, and has for its main object to provide a scale in combination with such instruments, whereby the opening thereof may be read on said scale easily, efficiently, and expeditiously.

Another object of this invention is to provide a scale of the mentioned character, in combination with mechanical means for opening or closing the dividers, calipers, or other instruments.

Still a further object of this invention is to provide, in a simple, efficient manner, two scales for such instruments, in the form indicated, whereby the opening of the instruments may be read in two different designations, as, for instance, one for engineers or shops, and the other for architects or navigators, etc.

My present invention, in a way, is related to and is an improvement on my invention for Removable adjusting attachment for dividers and the like, for which Letters Patent of the United States have been granted to me bearing No. 2,326,135.

Other objects of this invention will be apparent as the specification of the same proceeds, and, among others, I may mention: to provide a device as characterized hereinbefore, which will be simple in construction, easy and inexpensive to manufacture, and which may be made removable, that is, adapted to be attached to an existing instrument or to be removed therefrom, as desired.

In the drawings forming a part of this specification and accompanying the same;

Fig. 1 is a front elevational view of a pair of dividers to which one embodiment of my invention has been applied; and, Fig. 2 is a side elevational view of the same; while, Fig. 3 is a sectional view, the section being taken on the line 3—3 of Fig. 1;

Figs. 4 and 5 are detailed views of the arrangement of the measuring scale shown in the earlier figures; and Figs. 6 and 7 are fragmentary plan and sectional views, respectively, of a part in a modification of my invention.

Referring now to the drawings more in detail, by characters of reference, the numeral 10 indicates a pair of dividers, in general, being similar in construction to the pair of compasses shown and described in my said patent.

The dividers 10 will have two legs 11 and 12 having a pivoted joint 13, as it is well known in this art. A U-shaped member 14 is secured on one, the left hand leg 11 of the dividers, and a similar, but oppositely placed member 15, is secured on the other leg 12, as by the screws 16 and 17, as will be understood, and as has been described in said patent.

A rotatable pin 18 is set into the rear branch 19 of the U-shaped member 14, and a similar rotatable pin 20 is set into the rear branch 21 of the other U-shaped member 15.

The rotatable pin 18 carries a screw threaded ring member 22, and the other pin 20 carries a similar ring 23, the screw threads in the two rings being of opposite inclinations, one left handed and the other right handed, as has been described in my said patent.

An adjusting screw rod 24 passes through said rings 22 and 23, having an operating knurled disk 25 in the center thereof, by which it may be rotated, said rod having corresponding opposite screw threads at its two sides, to the left and to the right of the operating disk 25.

As has been described in my said patent, and as it will be obvious, the turning of the disk to the right or left, and with it the screw rod 24 will cause the legs 11 and 12 of the instrument, either to close one upon another, or to further open, as desired.

In my present invention I provide an upward extension 22a for the ring 22, and a similar upward extension 23a for the other ring. I also provide a scale device 26 for the left hand side of the instrument, and a similar, but oppositely placed scale device 27 for the right hand side thereof.

In the embodiment here illustrated, each of said scale devices may be in the form of an angular member having a normally horizontal longer branch 28, and a normally shorter vertical branch 29. The longer horizontal branch 28 slidably passes through a hole 30 in the respective extensions 22a or 23a, and the upper side thereof will carry scale markings 31 and 32, respectively, for the two scale members, it being my intention to show a different type of scale for each.

Adjacent to the operating wheel 25, a grooved ring 33 is secured to or formed with the screw rod 24 and the center disk 25, and so rotatable therewith.

The shorter vertical branch 29 of the scale member may have a circular cut out portion 34 formed in the center thereof, by which it may sit in the groove of the respective ring 33.

It will be obvious that in this manner, the adjusting screw 24 may be rotated and operated and thereby the legs 11 and 12 of the instrument may be set as desired, and during all these adjustments, the respective extensions 22a or 23a for said leg, will slide over the respective scale 31 or 32, and, in this manner, the opening of the instrument may be read very conveniently on the scale while the instrument is being adjusted or used.

In the embodiment of my device shown in the drawings, each rotatable pin 18 and 20 may have a circular groove 35 cut into it, and a securing screw 36 may be passed through the respective U-shaped member 14 or 15, each securing screw having a terminal narrower pin 37 riding in said circular groove 36, whereby the pins 18 and 20 may rotatably adjust themselves and still be kept within their members 14 or 15.

In Figs. 6 and 7 I illustrate a modification of my device, said figures showing only a new form for the adjusting screw rod 24, and, in this modification, the extensions 22a and 23a, as well as the scale members 26 and 27, may be omitted, and instead of that, a scale carrying member 38 may be directly set into the adjusting screw 24, showing the scale for the respective side of the adjusting rod, and the scale being read by the position of the respective ring 22 or 23 on the rod.

In a similar manner, a portion of the adjusting screw 24 may be flattened and the scale directly marked thereon.

Means may be provided to permit the points 39 and 40 of the dividers, calipers, or like instruments, to entirely close upon one another, if it is desired to start at number zero on the scale, as, for instance, the screw threaded rings 22 and 23 may be set somewhat further outwardly than the respective portions of the legs 11 and 12, so that the legs may entirely close upon one another before the rings 22 and 23 arrive to their centers. In this manner the rings can start from a zero point on the scale indicating an entirely closed position of the instrument.

While I have shown and described a preferred embodiment of my invention, I want it to be understood that changes and variations may be made in the elements, constructions, and combinations thereof, and I reserve my rights to all said changes and variations, which are in the spirit of this specification and in the scope of the claims hereunto appended.

It is to be understood that my invention as disclosed in the herein description, is also adapted to be built into newly manufactured instruments in a permanently secured manner, as an integral part thereof, and not only in a removable manner as has been shown in the drawings and described in the specification as an embodiment of my invention. Similarly, my invention is adapted to be used on other instruments than pivoted ones, in general, its principle may be applied to any device or instrument wherein two elements are to be closed upon or set further away from one another by a screw threaded rod, and it is desired to set the opening or distance between said elements, or to read the same, by a scale acting in association with the operating screw threaded rod.

In all such cases, one great advantage of my invention is that a desired dimension need not be taken from a separate scale for the instrument, but the instrument may be set to any desired dimension, measured by its scale or scales, whereby the operator gains in efficiency, speed, and in labor and saves trouble, as well as my invention eliminates a possible source of error.

What I claim as new and want to protect by Letters Patent of the United States, is:

1. In an instrument having legs pivoted at one end, the distance between the other end of said legs to be set for the use of the instrument, a pivoted nut in each leg, the two nuts being oppositely threaded, a rod passing through said nuts and being oppositely threaded from about the center thereof to the respective ends whereby a rotation of the rod will cause said legs to close upon one another or to open up, as desired, a projection on one of the nuts, an elongated scale member along which said projection may slide, said scale member being secured at about the center of said rod against axial movement thereon, but rotatably with reference to said rod.

2. In an instrument, as set forth in claim 1, an aperture in said projection, said scale being slidable in said aperture whereby the scale may be easier read by said projection and the scale fixed in its position.

3. In an instrument, as set forth in claim 1, a projection on the second nut, and a second scale arranged similarly to said first scale but along said second projection and towards the other end of the rod from about the center thereof, said two scales being of different character, as to their reading.

4. In an instrument having legs pivoted at one end, the distance between the other end of said legs to be set for use of the instrument, a pivoted nut in each leg, the two nuts being oppositely threaded, a rod passing through said nuts and being oppositely threaded from about the center thereof to the respective ends whereby a rotation of the rod will cause said legs to close upon one another or to open up, as desired, a projection with a through-going aperture on each nut, a knurled disk at the center of the rod to rotate the same, two grooved rings on the rod adjacent to said disk at the two sides thereof, an elongated scale through each aperture having a transverse inner leg with a substantially semi-circular recess at its end, whereby it may rotatably rest in the respective grooved ring on the rod, the two scales being of a different predetermined character as to their reading.

5. In an instrument having legs pivoted at one end, the distance between the other end of said legs to be set for the use of the instrument, a pivoted nut in each leg, the two nuts being oppositely threaded, a rod passing through said nuts and being oppositely threaded from about the center thereof to the respective ends whereby a rotation of the rod will cause said legs to close upon one another or to open up, as desired, a projection with a through-going aperture on one nut, a knurled disk at the center of the rod to rotate the same, a grooved ring on the rod adjacent to said disk at the side of said projection, an elongated scale through said aperture having a transverse inner leg with a substantially semi-circular recess at its end, whereby it may rotatably rest in the grooved ring on the rod.

HUGO FRIEDMANN.

REFERENCES CITED

The following references are of record in the file of this patent:

UNITED STATES PATENTS

| Number | Name | Date |
| --- | --- | --- |
| 921,407 | Irish | May 11, 1909 |
| 1,172,340 | Brunton | Feb. 22, 1916 |
| 2,298,000 | Eubanks | Oct. 6, 1942 |

FOREIGN PATENTS

| Number | Country | Date |
| --- | --- | --- |
| 69,149 | France | 1865 |
| 92,903 | Austria | June 11, 1923 |